INVENTORS
AGNEW E. LARSEN
ROBERT F. LeVINO

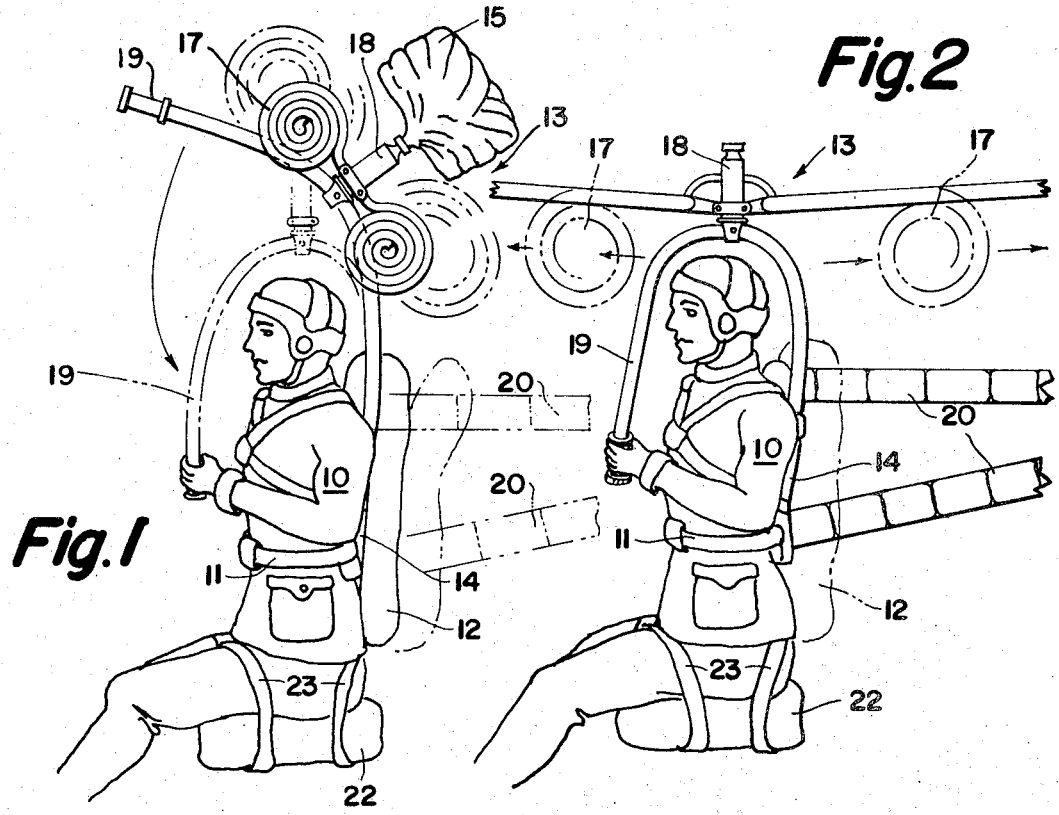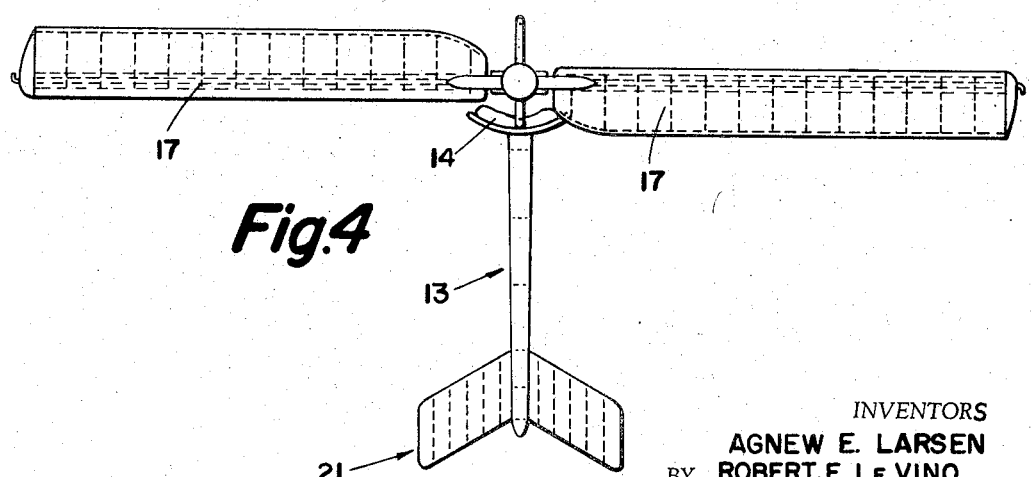

ATTORNEYS

United States Patent Office 3,362,665
Patented Jan. 9, 1968

3,362,665
AIR TO GROUND DESCENT MEANS
Agnew E. Larsen, New Britain, and Robert F. Le Vino, Huntingdon Valley, Pa., assignors to the United States of America as represented by the Secretary of the Army
Filed Dec. 22, 1965, Ser. No. 515,704
9 Claims. (Cl. 244—138)

ABSTRACT OF THE DISCLOSURE

A descent device including a parachute and an inflatable aircraft. The inflatable aircraft including rotor blades, tail booms, tail assembly, and an inflation means.

---

The invention described herein may be manufactured and used by or for the Government for governmental purposes without the payment to us of any royalty thereon.

The present invention relates to an air to ground descent means and more particularly to an air to ground descent means utilizing a parachute and a controllable dynamic rotachute having inflated rotor blades.

A parachute air-borne, emergency air escapee is subject to all of the inherent limitations imposed upon him by the relative lack of controlled descent of present service types of parachutes. These limitations of maneuverability also restrict and determine the scope of air-borne logistics of parachute operations. Accordingly, it is the object of this invention to remove these restrictive limitations of air-borne escape, and paratrooper operations by the addition of controlled mobility in descent to the medium of replacing and discarding the conventional parachute by mid-air transition into a controllable dynamic rotachute having inflated rotor blades.

Other objects and many of the attendant features of this invention will be readily appreciated as the same becomes better understood by reference to the following detailed description when considered in connection with the accompanying drawings in which like reference numerals designate like parts throughout the figures thereof and wherein:

FIG. 1 shows the invention in an early stage of inflation;

FIG. 2 shows the invention in an advanced stage of inflation;

FIG. 4 shows a top plan view of the invention fully inflated;

Figure 3:
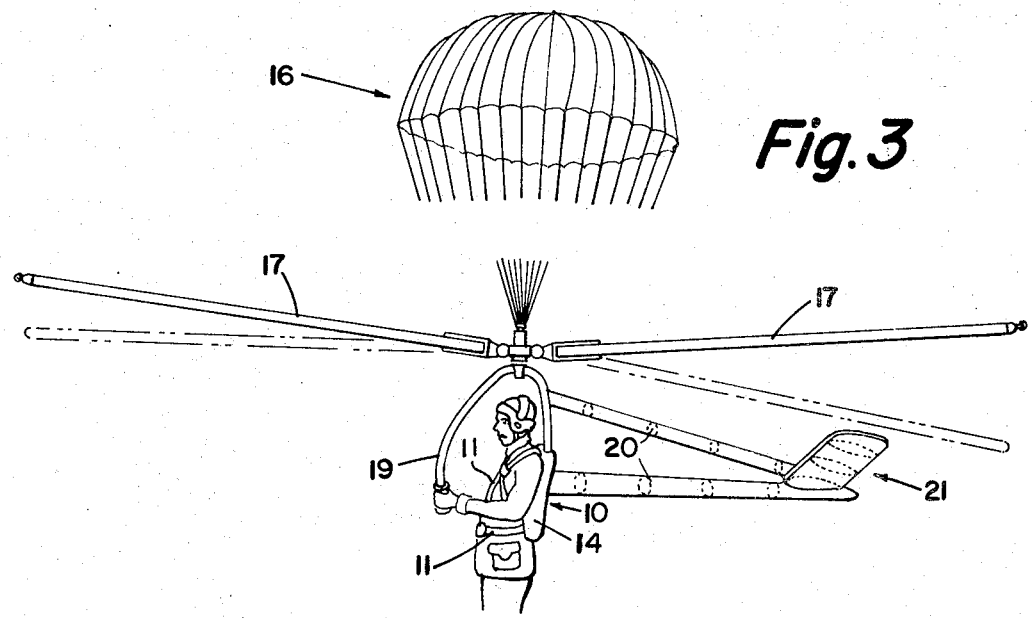
FIG. 3 shows a side view of the invention fully inflated.
Figure 5:
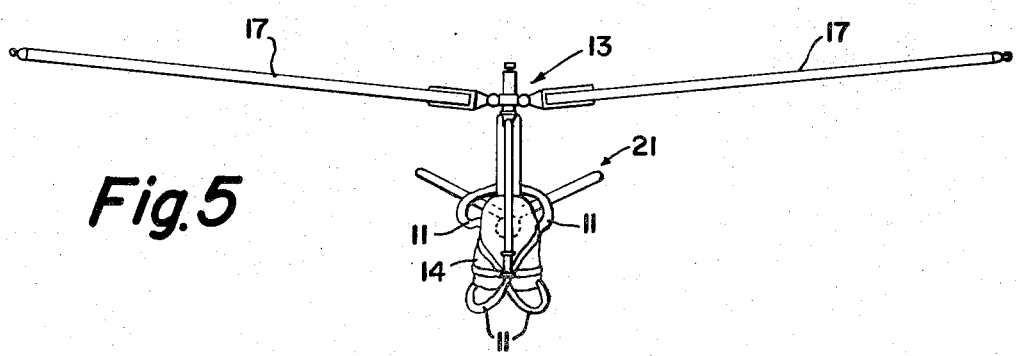
FIG. 5 shows a front view of the invention fully inflated.

Referring now to the drawings, wherein like reference characters designate like or corresponding parts throughout the several views, it is shown in FIG. 1 an escapee 10, seconds after having been ejected from his aircraft. Attached to the escapee 10, through straps 11, is a back parachute pack 12. Contained in said back parachute pack 12, in the folded condition, is an inflatable rotachute 13. A support vest 14 is attached to said rotachute 13 and to said straps 11 to secure the rotachute 13 to the escapee 10. Contained in said parachute pack 12 is a drogue parachute pack 15, which opens up into a parachute 16 (FIG. 3), a pair of tightly rolled inflatable rotor blades 17, a propellant actuated gas generator 18, and a preformed inflatable control stick 19. Attached to said control stick 19 and also contained in said back parachute pack 12 are two inflatable stabilizer tail booms 20. The two booms are multicellular tubes and are inflated at the same time as the rotor blades 17 and a tail assembly 21 (see FIG. 3).

Along with the back parachute pack 12, the escapee 10 also carries a seat pack parachute 22, attached by straps 23 for the purpose of safety in case of rotachute failure and as a seat while operating said rotachute.

Figure 6:
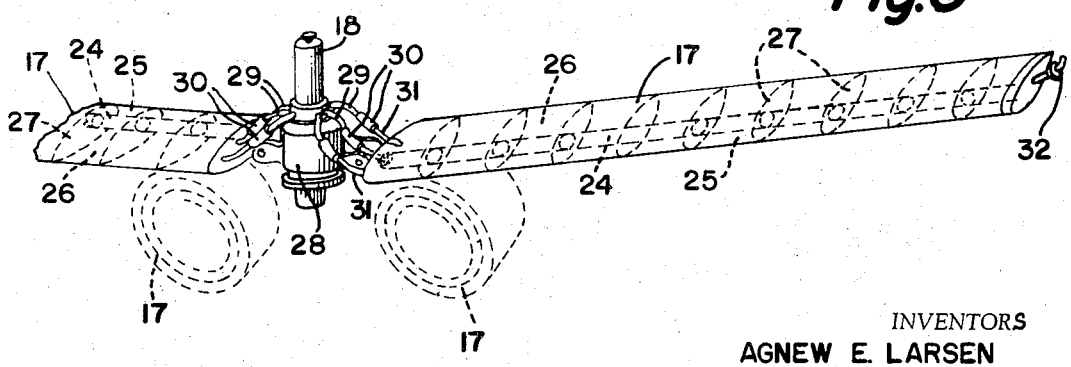
FIG. 6 shows an enlarged section of part of the invention.

As shown in FIG. 6, the inflatable rotor blades 17 are shown in two conditions, first in a noninflated rolled up condition, as illustrated by the dotted lines, and secondly in a fully inflated condition, as illustrated by the solid lines. The construction of the rotor blades 17 is preferably cellular, having a main spar tube section 24 of heavier walled material for high pressure of 30–50 p.s.i., a leading edge portion 25 for medium high pressure of 20–30 p.s.i., and a trailing section portion 26 for low pressure of 3–7 p.s.i. For aerodynamic shape, which is essential for autorotation, airfoil silhouette formers 27 are provided. These airfoil formers are fabric in nature and woven in by known textile methods. The propellant actuated gas generator 18 is shown mounted on top of a rotor hub 28 for the purpose of keeping it free from the rotating bearing means (not shown) required for the rotor hub. A series of pressure tube outlets 29, having regions of flexibility, shown at 30, are connected to pressure tube inlets 31 which lead into the respective blade contour sections. At the ends of the rotor blades 17 there is provided a combined counterweight and reaction tip jet 32.

In operation, the sequence would be ejection from the disabled aircraft (not shown). This could be accomplished by any of the known catapult types of ejection or by the escapee 10 merely jumping from the aircraft. Soon after ejection, the parachute pack 12 will be opened allowing the drogue parachute pack 15 to open thereby opening the main parachute 16. When the main parachute 16 is opened the escapee 10 will next inflate the rotor blades 17, tail surface supporting booms 20, and stabilizer tail assembly 21. The escapee 10 will then spin up the rotor blades 17. This is done by appropriate tip reaction jets 32 which serve the dual role of tip weights, for assistance of centrifugal force generated on and by them. These tip reaction jets 32 are supplied by high pressure gas, either bottled carbon dioxide pneumatic or propellant actuated gas generated, for a brief interval of 1½ to 2 seconds, in order to assure start of rotation, with inflation, or immediately thereafter. This requirement must be fulfilled prior to the generation of lift and is a prerequisite for autorotation, since it is the lift action of the rotor blades 17 which makes their automatic rotation possible. Then as soon as the sustained load on the parachute 16 is fully air-borne, and the reaction on the parachute release (not shown) becomes zero, it automatically functions or it could be manually operated by the escapee 10.

It is considered an important and basic concept that the overall system including the control stick 19 be produced from a relatively heavy fiberglass or plastic pylon and that said fiberglass or plastic pylon be preformed so that high pressure inflation renders them sufficiently rigid to perform these structural and control functions.

Some of the uses and advantages of the combination of parachute and controllable dynamic rotachute are as follows.

(1) For emergency escape from airplane:
  (a) Affords control and mobility of escapee, with possibility of return to friendly base.
  (b) Reduction of expenses in retrieving rescue of airmen, who are not wounded.
  (c) Permits better selection of landing sites, either on enemy or friendly territory for the escapee.

(d) Enables use of smaller parachutes initially which may be discarded as expendable once the rotachute is ready.

(e) Being smaller than the service-type parachute, both the stabilizing parachute and the rotachute offer lower target vulnerability during descent.

(2) Emergency landings of downed airmen:

(a) Provides a more characteristic and readily spotted target if rescue operations become necessary.

(b) By deflation of rotachute upon landing, a less readily spotted target, with better concealment possibilities from enemy searches, is acquired.

(3) Air-borne troops:

(a) Increase the scope of horizontal range thus broadening area of terrain coverage with small or smaller number of men.

(b) Permits wider or better selection of possibilities for landings in desired sites.

(c) The dispersion of many rotachutes offers lower target vulnerability during descent.

(4) Over-water aircraft emergency landings:

(a) Provides potentially buoyant life raft in place of possible parachute entanglement.

(b) More readily spotted visibility, if rescue operations become necessary.

Obviously many modifications and variations of the present invention are possible in light of the above teachings. It is therefore to be understood, that within the scope of the appended claims, the invention may be practiced other ways than as specifically described.

We claim:

1. In a device for air to earth descent, the combination of a parachute and an inflatable aircraft, said inflatable aircraft including tail booms, tail assembly, inflation means and rotor blades, said rotor blades including a main spar tube section capable of pressure from 30 to 50 p.s.i., a leading edge portion capable of pressure from 20 to 30 p.s.i., and a trailing portion capable of pressure from 3 to 7 p.s.i.

2. A device of the type described in claim 2, wherein said parachute and inflatable aircraft are secured to the body of a wearer by a support vest.

3. A device of the type described in claim 1, wherein said inflation means includes a gas generator.

4. A device of the type described in claim 3 wherein said gas generator is of the propellant actuated type.

5. A device of the type described in claim 1, wherein said rotor blades include airfoil silhoutte formers.

6. A device of the type described in claim 1, wherein said inflatable aircraft is controlled by an inflatable preformed control stick.

7. A device of the type described in claim 6, wherein said control stick is a preformed plastic.

8. A device of the type described in claim 6, wherein said control stick is a preformed fiberglass.

9. In a device for air to earth descent, combination of a main parachute and an inflatable aircraft, said inflatable aircraft including rotor blades, tail booms, tail assembly and an inflation means, said main parachute including a back parachute pack for holding in inactive position said main parachute and said inflatable aircraft, said back parachute pack further including a drogue parachute pack, said back parachute pack being so constructed and arranged that upon initiation of said drogue parachute said main parachute will open and by initiation of said inflation means said aircraft will inflate thereby providing controlled descent for the wearer of said back parachute pack.

References Cited
UNITED STATES PATENTS

| | | | |
|---|---|---|---|
| 3,117,744 | 1/1964 | Roman | 244—4 |
| 3,138,348 | 6/1964 | Stahmer | 244—17.15 |
| 3,184,187 | 5/1965 | Isaac | 244—43 |

MILTON BUCHLER, *Primary Examiner.*

R. A. DORNON, *Assistant Examiner.*